United States Patent [19]
Nichols

[11] 3,776,598
[45] Dec. 4, 1973

[54] FERRULE FOR SNOWMOBILE TRACK
[75] Inventor: George E. Nichols, Ottawa, Ohio
[73] Assignee: The Standard Products Company, Cleveland, Ohio
[22] Filed: Oct. 19, 1972
[21] Appl. No.: 299,047

[52] U.S. Cl. .................................................. 305/38
[51] Int. Cl. ............................................. B62d 55/24
[58] Field of Search ....................... 305/38, 36, 57

[56] References Cited
UNITED STATES PATENTS
3,477,767  11/1969  McNeil ............................. 305/38
3,722,963  3/1973  Cetrulo ............................. 305/38
2,957,731  10/1960  Backhaus ...................... 305/36 X
2,704,942  3/1955  Koile ................................. 305/57

Primary Examiner—Richard J. Johnson
Attorney—James H. Tilberry et al.

[57] ABSTRACT

An improved, reinforcing ferrule for the crossbars of an endless flexible track or belt used for driving snowmobiles or like apparatus. The ends of the ferrule are flared at the longitudinal ends thereof in the horizontal plane of the track.

13 Claims, 4 Drawing Figures

PATENTED DEC 4 1973　　3,776,598

FERRULE FOR SNOWMOBILE TRACK

This invention relates to the art of endless drive belts of flexible tracks and more particularly to an improved ferrule arrangement for the crossbars thereof.

The invention is particularly applicable to a ferrule arrangement for the endless track of a motor-driven snowmobile and will be described with particular reference thereto; however, it is to be understood that the principles of the invention have broader applications and may be employed in other instances with the various types of endless belts or tracks.

The track construction employed in snowmobiles and the like generally comprises two or more endless belts of molded rubber having a plurality of spaced, transversely-extending crossbars embedded therein to maintain the endless belts in a desired spaced parallel relationship. A ferrule or spacer or bushing generally is applied to each crossbar between adjacent edges of the endless belts. The drive means for the track usually comprises a mechanically driven sprocket which engages the ferrules to effect movement of the track. This type of drive arrangement is deemed conventional so that further elaboration thereon is not required. U. S. Pat. No. 3,477,766 issued Nov. 11, 1969 to G. I. McNeil, however, illustrates the above described construction.

Tracks thus typically constructed have heretofore experienced substantial crossbar failures during ordinary services. These failures generally require replacement of the complete track at considerable expense to the owner of the vehicle. It has been found that the crossbars have fatigued primarily as a result of high dynamic, single point tooth loadings exerted on the crossbar during driving operation thereof.

In an effort to alleviate the fatigue failures described above, ferrules, or crossbar protective members were developed. Ferrules in current use aggravate this condition, however, because a uniformly distributed sprocket tooth loading is transmitted by the ferrule to the crossbar as single point end loadings. These single point end loadings, representing stress concentrations, materially decrease the life of the crossbars.

The present invention comtemplates a new and improved ferrule for use on an endless track overcomes the above referred to problems and others and provides a ferrule which substantially increases crossbar life and is simple in design and easy to manufacture.

In accordance with the present invention, the ferrule is comprised of generally flat upper and lower surfaces communicating with arcuate forward and rearward surfaces. The forward and rearward surfaces are flared in a horizontal plane at the longitudinal ends thereof generally parallel to the upper and lower surfaces.

In accordance with another aspect of the present invention, the ferrule includes a longitudinally extending slit-like area along either its upper or lower surface to permit a slight deflection of the ferrule under loading. The slit-like area is preferably V-shaped.

In accordance with still another aspect of the present invention, the upper surface of the ferrule is flat so as to establish a generally flat relationship between the ferrule and the surfaces of the endless rubber belts.

It is the principal object of the present invention to provide a flexible track or endless belt which has a greater life expectancy than those heretofore in existence.

Another object of the present invention is the provision of means to remove the stress concentration imposed on the crossbars by the ferrules during driving operation of the track.

Another object of the present invention is the provision of means to accurately position the crossbar in the belt molds when molding the track.

Still another object of the present invention is the provision of means to distribute end loadings of the ferrule over portions of the crossbar and to insure uniform loading over the entire crossbar.

A further object of the present invention is the provision of an improved ferrule which is readily adaptable to use with any number of specific endless track designs.

The invention may take physical form in certain parts and arrangements of parts, a preferred embodiment of which will be described in detail in this specification and illustrated in the accompanying drawings which form a part hereof and wherein.

Figure 1:
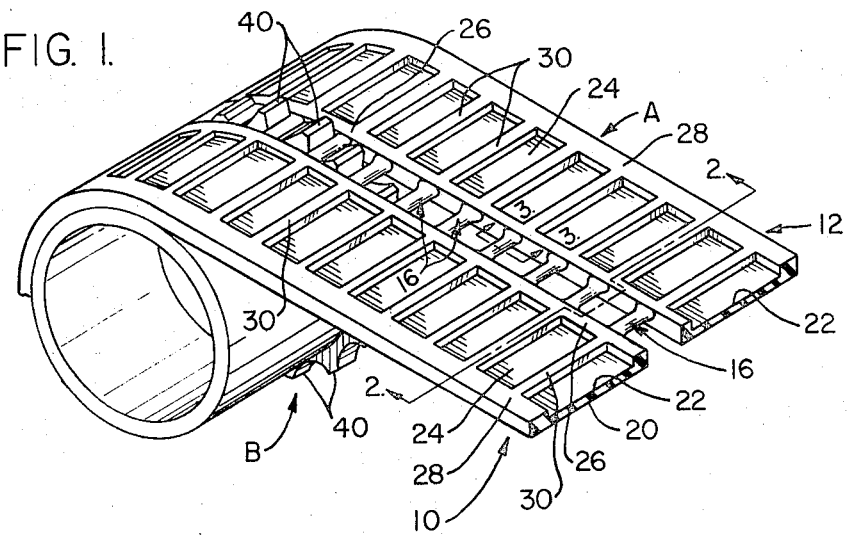
FIG. 1 is a perspective view of an endless belt showing the general arrangement of component parts.

Referring now to the drawings wherein the showings are for the purpose of illustrating a preferred embodiment of the invention only and not for purposes of limiting same, FIG. 1 generally illustrates an endless flexible track A for use in a snowmobile driven by a conventional sprocket B. Flexible track A is comprised of at least a pair of endless rubber belts generally designated 10,12 interconnected by a plurality of transversely extending crossbars 14 embedded therein. The construction of track A is deemed to be conventional so that further elaboration thereon is not required. A ferrule fits over each crossbar 14 and extends between endless belts 10,12.

Figure 2:
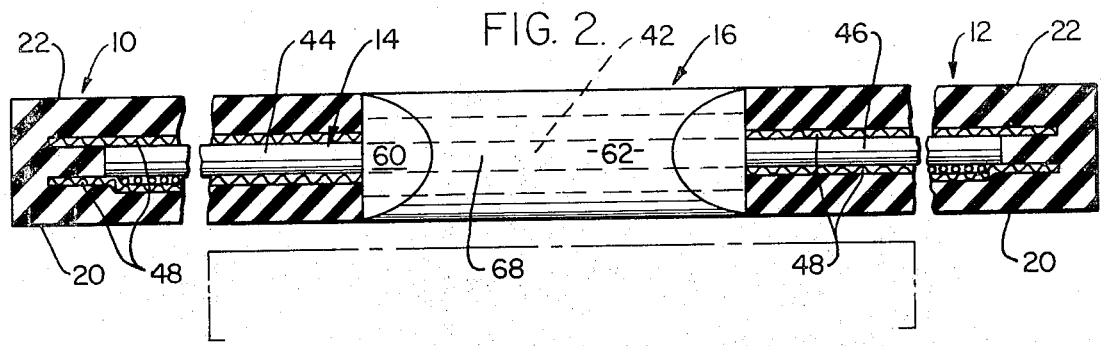
FIG. 2 is a cross-sectional view taken along lines 2—2 of FIG. 1.

As best shown in FIGS. 1 and 2, belts 10,12 are identical but oppositely disposed to each other and include generally flat interior surfaces 20 and irregular terrain engaging exterior surfaces 22. Flat interior surfaces 20 engage a conventional slide or suspension unit on the vehicle itself, which slide is shown in phantom in FIG. 2. Exterior surface 22 engages the terrain and includes a plurality of rectangular depressions 24 disposed therealong. Depressions 24 are defined by inner and outer longitudinally extending ridges 26,28 bisected by transversely extending ribs 30. Other configurations for depressions 24 may be employed as desired without affecting the scope and intent of the subject invention.

Crossbars 14 extend transversely of track A parallel to one another at spaced intervals corresponding to the pitch between consecutive teeth 40 of sprocket B. These crossbars may be of any desired material but preferably are of high carbon or alloyed steel. Each crossbar comprises an elongated, generally flat member having a width dimension greater than the thickness dimension and including an exposed middle portion 42 and identical, mounted end portions 44,46. End portions 44,46 are embedded in belts 10,12 respectively and conveniently secured against movement therein by means of being wrapped in a relatively stiff, canvas-type material 48. This structure provides a relatively low section modulus in the vertical plane by virtue of the smaller thckness dimension which permits track A to flex vertically. Also, there is afforded a relatively high section modulus in a horizontal plane tending to reduce flexure of the crossbars from sprocket gear teeth loading.

Figure 3:
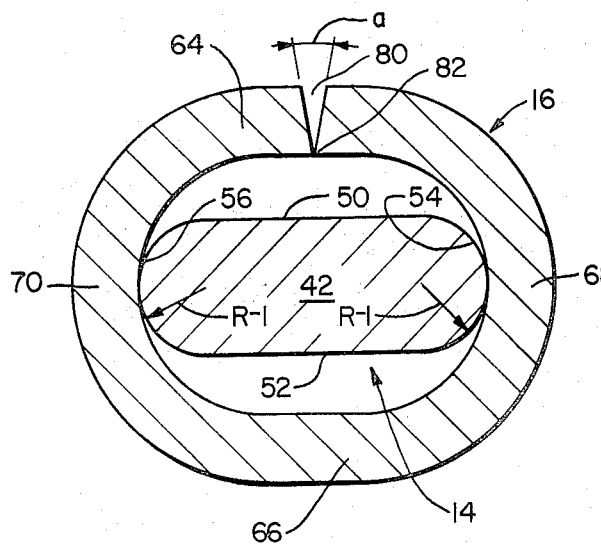
FIG. 3 is a cross-sectional view taken along lines 3—3 of FIG. 1.
Figure 4:
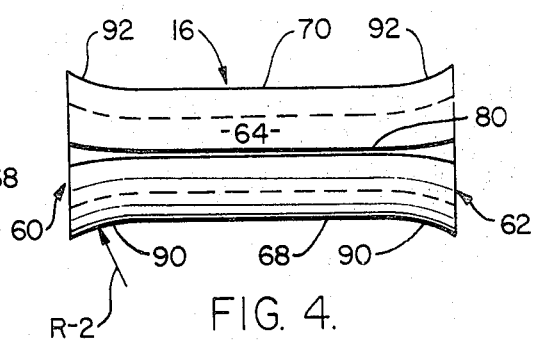
FIG. 4 is a plan view of a ferrule formed in accordance with the concepts of the subject invention.

The exposed middle portion 42 is defined as those portions of the crossbars extending between inner longitudinally extending ridges 26 of belts 10,12. As best shown in FIG. 3, each crossbar 14 includes generally flat, upper and lower surfaces 50,52 and arcuate forward and rearward surfaces 54,56 respectively which blend into the upper and lower surfaces. In the preferred embodiment of the invention, the forward and rearward surfaces are defined by equal radii R-1 tangential to the upper and lower surfaces, although other arcuate configurations could also be employed. It should be noted that the above described configuration of crossbars 14 is for all the portions 42,46 and 48.

The elongated ferrules generally designated 16 are each adapted to fit over a crossbar middle portion 42. Although the ferrules may be constructed from any desired material, hardened or alloyed steel is preferred. Each ferrule extends between belts 10,12 and includes flared ends 60,62 abutting the longitudinally extending inner edges of the opposing belts. Each ferrule has generally flat upper and lower wall portions 64,66 integral with arcuate forward and rearward wall portions 68,70 respectively. In the preferred embodiment of the invention, and as best shown in FIG. 3, each of these wall portions has interior and exterior surfaces. The interior surfaces of wall portions 68,70 are dimensioned to closely embrace portions 54,56 of crossbar 14 and wall portions 64,66 are dimensioned so that a clearance area is provided between the interior surfaces therof and upper and lower surfaces 50,52 respectively of the crossbar. With this arrangement and when the ferrule includes flared ends 60,62, the crossbar may flex in all directions during track use without the establishment of any undesirable stress points thereon. Such stress points would otherwise be established during track use as flexure of the crossbar in any direction caused it to contact the ends of the ferrule. The close fitting relationship between the interior surfaces of ferrule wall portions 68,70 and crossbar portions 54,56 acts to retain the ferrule in its proper position during track use. With respect to the exterior surfaces of wall portions 68,70, it should be noted that they may assume any arcuate configuration as long as proper engaging contact may be made with sprocket teeth 40. As shown in FIG. 2, the exterior surfaces of wall portions 64,66 are such that they are generally coplanar with interior and exterior surfaces 20,22 of belts 10,12. Thus, at least the entire interior surface of track A is flat so that interference with the snowmobile suspension slide (phantom in FIG. 2) is avoided.

Extending longitudinally along either of upper or lower wall portions 64,66 of the ferrule is a slit. In the preferred embodiment this slit is designated by numeral 80 and is disposed to extend through upper portion 64. From FIG. 3, it will be seen that the slit is generally V-shaped. The included angle a between the side of the V-shaped slit is preferably within 10°to 15°although other angles may be employed without departing from the scope of the invention. The base or innermost part 82 of slit 80 and preferrably within the tolerances of 0.00 inches to 0.04 inches, although other suitable openings may be applied and acceptably employed. When assembled over crossbar middle portion 42, ferrule 16 is slightly expanded to a prestressed condition to provide further assurance that it will not rotate around the crossbar when a load from sprocket B is applied during vehicle operation. Slit 80 also assures that the sprocket tooth loading will be uniformly distributed over the middle portion of the crossbar.

The longitudinal ends 60,62 of forward and rearward wall portions 68,70 are desirably flared outwardly in a generally horizontal plane. The flaring of ends 60,62 originates from points or lines of flare 90,92 on both the forward and rearward wall portions 68,70. The location of the points or lines of flare are determined by the width of teeth 40 on sprocket B and the tolerance of the track within suspension slide and track guide. In the preferred embodiment for a standard arrangement, the points of flare 90,92 are located inwardly of end portions 60,62 approximately one-quarter inch in a ferrule 14 of approximately 1⅜ inches in length. Generally, flared ends 60,62 originate from lines of flare which are straight although it will be apparent that the lines of flare could take arcuate paths. Thus, and as shown in the preferred embodiment, the lines of flare are comprised of a radius R-2.

As thus constructed, ferrules 16 assure a uniform distribution of load on crossbars 14 inasmuch as flared ends 60,62 prevent end point loadings. Further, when the flared ends are constructed along arcuate lines of flare, any tendency of the sprocket tooth force to concentrate at the points of flare is eliminated as the force distributes itself over the arcuate path presented thereby.

Several advantages of the above described construction should be additionally noted. One such feature which increases the uniform distribution of load thereon while also avoiding the adverse effects of stress concentrations is the utilization of the rubber from the track-forming process which fills the space between the flares of the ferrules and the crossbars. Thus, if point loading was to occur at the flared ends of the ferrules, the loading would be uniformly distributed by the rubber.

An additional feature of the invention resides in the economics of its construction and application to crossbars 14. Ferrules presently in use are solid, one-piece constructions so that it is extremely difficult to flare them. Because the subject new ferrule design includes a longitudinal slit 80, it is relatively easy to flare ends 60,62 along any desired line or path by a simple press operation. Further, critical assembly tolerances are eliminated because the ferrules are slightly stressed when applied to the crossbars 14.

Another desirable attribute of the subject new ferrule resides in the use of the ferrule during manufacture of track A. The track is usually formed by injecting rubber or rubber compositions into a mold to form the elongated belts 10,12 with crossbars 14 in place. Prior to injecting the rubber, the crossbars must be accurately positioned within the mold in both the horizontal and vertical planes and the crossbar end portions at least wrapped with canvas material 48. As it is the attitude of the ferrules with respect to each other which is critical, it will be seen that flared ends 60,62 provide readily accessible areas for holding fixtures. Furthermore, and during molding, the flared ends additionally assure alignment of the ferrules by receiving rubber material therein since, and as noted above, the crossbar middle portions 42 extend partially into the opposed inner edges of belts 10,12. Thus, in a sense, the crossbars have their middle portions integrally molded with belts 10,12 to assure accurate overall construction of the track.

The invention has been described with reference to the preferred embodiment. Obviously, modifications and alterations will occur to others upon the reading and understanding of this specification. It is my intention to include all such modifications and alterations insofar as they come within the scope of the appended claims or the equivalents thereof.

Having thus described my invention, I now claim:

1. In an endless, flexible track comprised of a plurality of elongated belts of flexible material, a plurality of crossbars extending transversely of said belts at spaced intervals and having portions thereof embedded in said belts for interconnecting said belts, each crossbar having at least one exposed middle portion extending between opposing edges of said interconnected belts and a ferrule over each middle portion adapted to engage driving means, the improvement comprising:

said ferrule having integral upper, lower, forward and rearward walls with said forward and rearward walls being flared at the longitudinal ends thereof in the horizontal plane of said belts.

2. The improvement of claim 1 wherein said upper and lower walls have generally flat surfaces and are coplanar with the surfaces of said belts.

3. The improvement of claim 1 wherein said flexible material is interposed between said flared ends of said ferrule and said middle portion of said crossbar.

4. The improvement of claim 1 wherein said forward and rearward walls are arcuately shaped, the outer surfaces of all of said walls defining the exterior periphery of said ferrule and the interior surfaces of all of said walls defining the interior periphery of said ferrule, at least said interior surfaces of said forward and rearward walls being adapted to closely embrace said middle portion of said crossbar.

5. The improvement of claim 1 wherein the inner surfaces of said forward and rearward walls are flared at angles generally between 10° to 30°.

6. The improvement of claim 4 further including a longitudinally extending slit through one of said upper and lower walls.

7. The improvement of claim 6 wherein said slit is generally V-shaped.

8. The improvement of claim 7 wherein said slit has a width of generally between 0.00 inches and 0.04 inches at said interior periphery, 9. The improvement of claim 8 wherein the inner surfaces of said forward and rearward walls flare outwardly along a pair of arcuate paths extending from a point on the longitudinal center of said forward and rearward walls to points at the uppermost and lowermost ends of said forward and rearward walls at the longitudinal ends of said ferrule.

10. A new ferrule for use in an endless flexible belt comprised of a plurality of elongated belts of flexible material, a plurality of crossbars extending transversely of said belts at spaced intervals and having portions thereof embedded in said belts for interconnecting said belts, each said crossbar having at least one exposed middle portion extending between opposing edges of said interconnected belts, said ferrule being dimensioned to be received over one of said crossbar middle portions and comprising:

integral upper, lower, forward and rearward walls, said forward and rearward walls being flared at the longitudinal ends thereof in the horizontal plane of said belts.

11. The ferrule as defined in claim 10 wherein said upper and lower walls have generally flat surfaces generally parallel to each other.

12. The ferrule as defined in claim 11 wherein said forward and rearward walls are arcuately shaped and disposed in a concave relationship to each other.

13. The ferrule as defined in claim 12 further including a longitudinally extending slit through one of said upper and lower walls.

* * * * *